Figure 1:
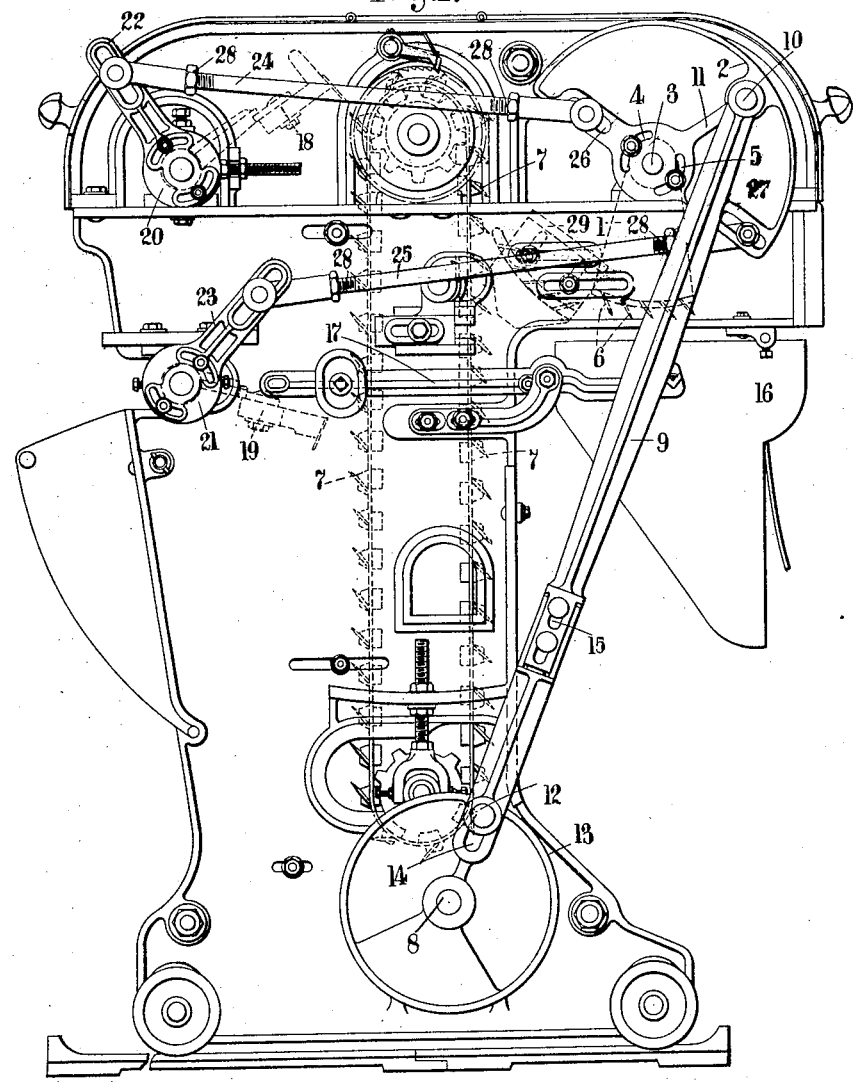

Dec. 23, 1924.  
J. P. MACKIE  
CARD FEED  
Filed March 5, 1924

1,520,034

2 Sheets-Sheet 1

INVENTOR  
John P. Mackie  
per Hubert A. Gill  
Attorney

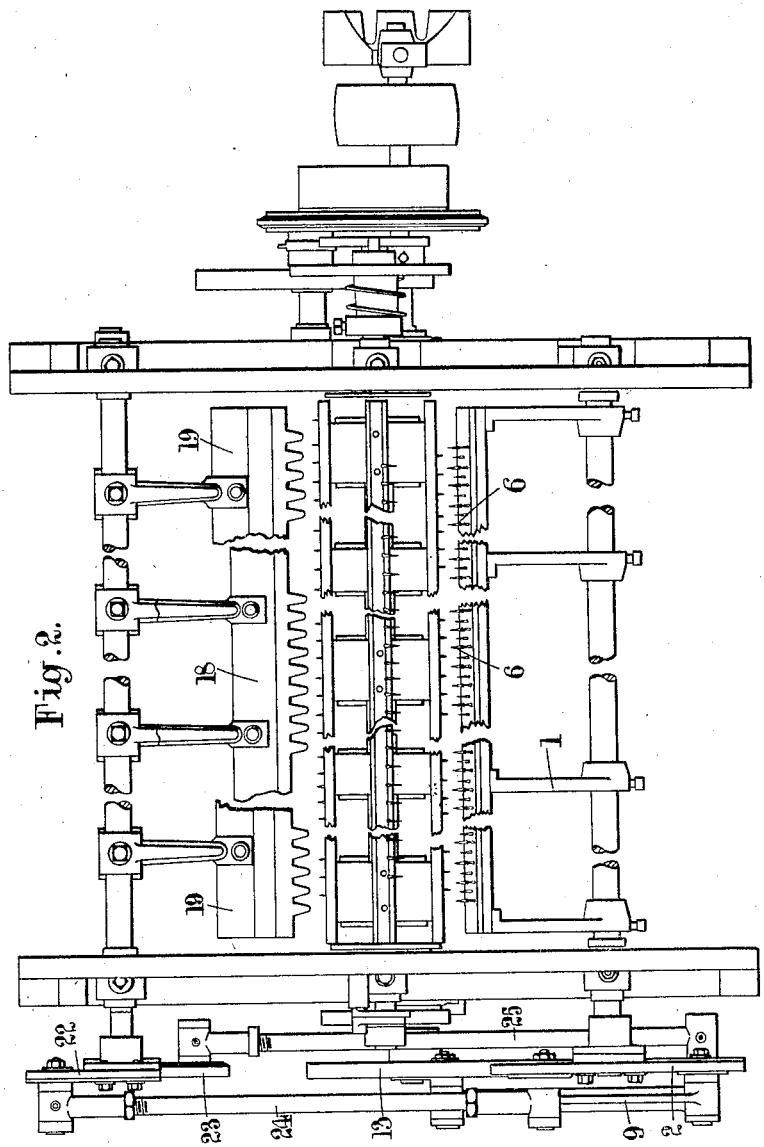

Patented Dec. 23, 1924.

1,520,034

UNITED STATES PATENT OFFICE.

JOHN P. MACKIE, OF BELFAST, IRELAND.

CARD FEED.

Application filed March 5, 1924. Serial No. 697,056.

*To all whom it may concern:*

Be it known that I, JOHN PRINGLE MACKIE, commonly known as JACK P. MACKIE, a British subject, and resident of Albert Foundry, Springfield Road, Belfast, Ireland, have invented certain new and useful Improvements in Card Feed (for which I have filed an application in England dated 15th August, 1923), of which the following is a specification.

This invention relates to automatic feeders for carding engines and its main object is to provide an improved form of feeder which shall be comparatively inexpensive to manufacture and reliable in operation. The invention is more particularly concerned with the type of card feed such as set forth in the specification of Liebscher's British Patent No. 11980/1902 wherein, in order to produce a uniform sliver, the material is passed from the lattice or feed apron on to the pan of a continously acting balance, the movement of which serves to stop the driving of the lattice as soon as a pre-determined weight of material upon the balance is exceeded.

According to the present invention, such an automatic feeder for carding engines is arrangel with the doffer, which removes the material from the lattice and discharges it into the pan of the balance, pivotally mounted on a fixed or adjustable axis in the frame of the machine, the said doffer being adjustably mounted on a segment mounted to oscillate about its axle. The said segment or a separate crank arm fixed to the axle is connected by a link with an adjustable connection to a crank disc or arm mounted on the main driving shaft at the base of the feed frame. Preferably the two knife combs which engage with the lattice on the ascending side, that is the side of the lattice opposite to the doffer, are each adjustably mounted on a disc from which a crank arm projects. These crank arms are respectively connected to points in the segment attached to the doffer by means of links with slotted connections in the segment or in the crank arms or both, while the links are also provided with means for adjusting their length and the attachment points to the segments are on opposite sides of its axis in order to provide for one comb to strike downwardly while the other is rising and vice versa.

An automatic feeder constructed in accordance with the present invention is illustrated in the accompanying drawings in which:—

Figure 1 is an elevation of the feeder viewed from the crank end of the main driving shaft, and Figure 2 is a plan of the same.

In these drawings the doffer 1 is adjustably mounted on a segment 2 which in its turn is mounted to rock about a fixed axle 3 in the frame of the machine. The adjustable connection between the doffer 1 and the segment 2 is effected by means of slots 4, 5, in the latter and bolts which secure the doffer 1. The latter is provided with rows of pins 6 which intercalate with the pins 7 on the lattice boards. The segment 2 is driven from the main driving shaft 8 at the base of the feed frame by means of a link 9. The link 9 at its upper end is connected to a pin 10 carried by one arm 11 of the segment 2. At its lower end, the link 9 is connected to a crank pin 12 carried by a crank disc 13 on the main driving shaft 8. The connection between the crank pin 12 and the link 9 is made adjustable by means of a slot 14 in the lower end of the link 9. The latter is also separately adjustable as regards its length by means of slots 15 formed in the lower part of the link 9 and engaged by bolts secured to the upper part of the link 9. As will be understood, the function of the doffer 1 is to remove the material from the descending side of the lattice 7 and cause it to pass over the pan 16 of the balance shown generally at 17. The mechanism by which the driving of the lattice 7 is stopped when the balance pan 16 sinks is not shown in the drawing. A pinned member 29 is provided and its pins engage the pin 6 of the doffer on their return or upward stroke and clean the latter before the latter again engage the pins 7 of the lattice.

The two knife combs 18 and 19 which operate upon the ascending side of the lattice 7, act in conjunction to remove surplus material from the lattice. The combs 18 and 19 are mounted respectively on discs 20 and 21 by means of slot and bolt connections and the discs 20 and 21 are each formed integral with a crank arm 22, 23. The combs 18 and 19 are operated from the segment 2 by means of links 24 and 25, which are secured adjustably to the segment 2 by slotted connections 26, 27, the link 24 being also secured to the crank 22 by a slotted connection and the link 25 to the crank 23 by a slotted connection. The links 24 and 25 are also each adjustable in length by means of screw connections 28. It will be noticed that the points at which the links 24 and 25 are connected to the segment 22 by means of the slotted connections 26 and 27 lie on opposite sides of the axle 3, so that as the comb 18 strikes downwardly the comb 19 is about to rise and vice versa.

This arrangement allows of the doffer and both knife combs to be driven from a single crank 13 on the main shaft 8 through the segment 2 and the links 24, 25; thus the use of separate driving mechanisms for the doffer 1 and the knife combs 18, 19 is avoided, while provision is made for adjustment of each of the parts in any manner that can possibly be required and the transmission is effected with a minimum of moving parts.

The construction also enables a practically perfect balance of the parts to be obtained, for example, the segment 2 is so formed that together with the proportion of the weight of its link or connecting rod 9, it will just balance the weight of the doffer 1 about the rocking axis 3. Then, as already pointed out, the knife combs 18, 19 are operated alternately so that these can be balanced one against the other by correct adjustment of the connection points between the crank arms 22, 23 and the links 24, 25 and of the lengths of these latter. The knife combs 18, 19 are also arranged that as they rise to the top of their stroke into the position shown for the comb 18 in Figure 1, they are each balanced by their crank arms 22, 23 about their pivoting axes, while at the lower portion of their downward stroke, in the position shown in Figure 1 for the comb 19, the crank arms add their weight to that of the combs, thus assisting in the working stroke. The crank disc 13 on the main shaft 8 also is preferably balanced in respect of the crank pin 12 and the weight of the connecting rod 9 which acts upon the crank pin 12. Further, it will be seen that by means of the bolt and slot connections, even after the connecting rods 9, 24 and 25 have been adjusted and secured, the doffer 1 and the combs 18 and 19 can still be adjusted and clamped in any angular position.

Having thus described my invention what I claim as new and desire to secure by Letters Patent is:—

1. In an automatic feeder for carding engines, the combination of a machine frame, a lattice mounted therein, a driving shaft journalled in said frame, a crank fixed on said driving shaft, a segment pivotally mounted in said frame, a doffer fixed to said segment in an angularly adjustable manner relatively to said segment and a connecting rod connected to said crank and to said segment in order to rock the latter.

2. In an automatic feeder for carding engines, the combination of a machine frame, a lattice mounted therein, a driving shaft mounted in said frame, a crank fixed on said driving shaft, a segment pivotally mounted in said frame, a connecting rod transmitting the drive from said crank to said segment and a doffer fixed to said segment in such a position as to be substantially balanced by said segment and said connecting rod.

3. In an automatic feeder for carding engines, the combination of a machine frame, a lattice mounted therein, a member pivoted in said frame to rock about its pivotal axis, a pair of knife combs pivotally mounted in said frame in position to engage said lattice and a pair of links each operatively connected to one of said knife combs, said links being also connected to said rocking member on opposite sides of its pivot so as to rock said knife combs in alternate sequence.

4. In an automatic feeder for carding engines, the combination of a machine frame, a lattice mounted therein, a segment mounted to rock about a pivotal axis in said frame, a pair of crank arms pivotally mounted in said frame, a pair of links each connecting one of said crank arms to said segment, said links being attached to said segment on opposite sides of the pivotal axis thereof and a pair of knife combs fixed in an angularly adjustable manner respectively to said two crank arms so that said knife combs are driven in alternate sequence and are balanced one against the other.

5. In an automatic feeder for carding engines, the combination of a machine frame, a lattice mounted therein, a segment mounted to rock in said machine frame, a pair of knife combs each mounted to rock about a pivotal axis in said machine frame, a pair of crank arms each fixed to one of said knife combs, a pair of links each connecting one of said link arms to points on opposite sides of the pivotal axis of said rocking segment, each of said knife combs being fixed at an angle to its respective crank arm so that each crank arm balances its respective knife comb at the commencement of the operative stroke of the latter, but adds its weight to the said knife comb towards the end of the operative stroke of the latter.

6. In an automatic feeder for carding engines, the combination of a machine frame, a lattice mounted therein, a segment mounted in said machine frame to rock about a pivotal axis and having two arms extending in opposite directions from said pivot, a pair of knife combs pivoted in said machine frame in position to co-act with said lattice, a pair of crank arms each fixed to one of said knife combs and a pair of connecting links adjustably secured at the one end to opposite arms of said segment and at the other end adjustably secured to the respective crank arms.

7. In an automatic feeder for carding engines, the combination of a machine frame, a lattice mounted therein, a driving shaft journalled in said machine frame, a crank carried by said driving shaft, a three-armed segment mounted in said machine frame to rock about a pivotal axis therein, a connecting rod connecting said crank to the mid arm of said segment, a pair of knife combs mounted upon pivots in said machine frame to co-act with said lattice, a pair of crank arms each fixed to one of said knife combs and a pair of connecting links connected at the one end to opposite arms of said segment and at the other end connected to the respective crank arm.

8. In an automatic feeder for carding engines, the combination of a machine frame, upper and lower sprocket wheels journalled in said frame, a pinned lattice driven by said sprocket wheels, a driving shaft, a crank disc mounted thereon, a doffer pivotally mounted in said frame in position to engage the descending side of said lattice, a balance system having a scale pan in position to receive the sliver from said doffer, a three-armed segment secured to said doffer in an angularly adjustable manner, an adjustable connecting rod connecting said crank disc to the middle arm of said segment, a pair of knife combs pivotally mounted in said frame in position to engage the ascending side of said lattice, a pair of crank arms each fixed in an angularly adjustable manner to one of said knife combs and a pair of adjustable connecting links fixed at the one end to opposite arms of said segment and at the other end to the respective crank arm.

In witness whereof, I hereunto subscribe my name this 18th day of February A. D. 1924.

JACK P. MACKIE.